(12) United States Patent
Maunder et al.

(10) Patent No.: US 8,521,741 B1
(45) Date of Patent: Aug. 27, 2013

(54) SYSTEMS AND METHODS FOR PERFORMING INTEGRATED SEARCHES WITH ACTIONS

(75) Inventors: Anurag Maunder, Fremont, CA (US); Christos Tryfonas, San Francisco, CA (US); Sudhakar Muddu, Milpitas, CA (US)

(73) Assignee: EMC Corporation, Hopkinton, MA (US)

( * ) Notice: Subject to any disclaimer, the term of this patent is extended or adjusted under 35 U.S.C. 154(b) by 624 days.

(21) Appl. No.: 12/030,153

(22) Filed: Feb. 12, 2008

Related U.S. Application Data

(60) Provisional application No. 60/951,908, filed on Jul. 25, 2007, provisional application No. 60/951,912, filed on Jul. 25, 2007, provisional application No. 60/951,913, filed on Jul. 25, 2007, provisional application No. 60/951,915, filed on Jul. 25, 2007, provisional application No. 60/951,916, filed on Jul. 25, 2007.

(51) Int. Cl.
*G06F 17/30* (2006.01)

(52) U.S. Cl.
CPC .............................. *G06F 17/30705* (2013.01)
USPC ........................... 707/737; 707/770; 707/799

(58) Field of Classification Search
USPC ............ 707/770, 769, 737, 799; 395/200.43; 705/14
See application file for complete search history.

(56) References Cited

U.S. PATENT DOCUMENTS

| | | | | |
|---|---|---|---|---|
| 5,848,241 | A * | 12/1998 | Misinai et al. | 709/213 |
| 6,760,727 | B1 * | 7/2004 | Schroeder et al. | 707/770 |
| 6,981,005 | B1 * | 12/2005 | Cabrera et al. | 707/638 |
| 7,584,227 | B2 * | 9/2009 | Gokhale et al. | 707/802 |
| 2002/0072974 | A1 * | 6/2002 | Pugliese et al. | 705/14 |
| 2008/0004904 | A1 * | 1/2008 | Tran | 705/2 |
| 2008/0005196 | A1 * | 1/2008 | Beck | 707/203 |
| 2009/0109959 | A1 * | 4/2009 | Elliott et al. | 370/352 |
| 2009/0216798 | A1 * | 8/2009 | Wahlert et al. | 707/103 R |

OTHER PUBLICATIONS

"U.S. Appl. No. 12/098,342", filed Apr. 4, 2008.
"U.S. Appl. No. 12/098,338", filed Apr. 4, 2008.
U.S. Appl. No. 11/933,111, filed Oct. 31, 2007.
U.S. Appl. No. 12/023,931, filed Jan. 31, 2008.
U.S. Appl. No. 12/030,158, filed Feb. 12, 2008.
U.S. Appl. No. 12/023,941, filed Jan. 31, 2008.

* cited by examiner

*Primary Examiner* — Shahid Alam
(74) *Attorney, Agent, or Firm* — Dergosits & Noah LLP; Todd A. Noah (57) ABSTRACT

A system for performing integrated searches and actions is disclosed. The system may include a search engine configured to generate a search result or report in response to a search query. The system may also include a queue manager coupled with the search engine. The queue manager may be configured to receive the search result or report from the search engine. The queue manager may also be configured to assign files in the search result or report to one or more service provider queues according to an action profile. The system may also include one or more nodes coupled with the one or more service provider queues. The one or more nodes may be configured to perform one or more actions on one or more files in the one or more service provider queues according to the action profile.

22 Claims, 8 Drawing Sheets

| | | Search Result Set | | | | |
|---|---|---|---|---|---|---|
| | | https://Search | | | | |
| | | Perform Actions on Results | | | | |
| | No. | File name | Size | Type | Modification date | Metadata |
| ☒ | 1. | Confidential.txt | 144 | Text | 07/18/2007 | 🔘 |
| ☒ | 2. | patent.doc | 52336 | Word | 06/22/2007 | 🔘 |
| ☒ | 3. | abc.xls | 13824 | Excel | 02/12/2007 | 🔘 |
| ☒ | 4. | Finanical_info.eml | 1358 | Mail | 09/25/2006 | 🔘 |
| ☒ | 5. | report.doc | 24054 | Word | 07/28/2006 | 🔘 |
| ☒ | 6. | Presentation.ppt | 204288 | Powerpoint | 07/04/2006 | 🔘 |
| ☒ | 7. | web.html | 19276 | HTML | 05/29/2006 | 🔘 |
| ☒ | 8. | Patent_figures.pdf | 28258 | PDF | 01/02/2006 | 🔘 |
| ☒ | 9. | patent.mp3 | 356256 | MP3 | 08/15/2005 | 🔘 |
| ☒ | 10. | test.txt | 65 | Text | 02/04/2004 | 🔘 |

SYSTEMS AND METHODS FOR PERFORMING INTEGRATED SEARCHES WITH ACTIONS

The present invention claims priority under 35 USC 119(e) to a commonly owned provisionally filed patent application entitled "SYSTEMS AND METHODS FOR FACILITATING MANAGEMENT OF DATA," U.S. Application No. 60/951,908, filed Jul. 25, 2007 by inventors Sudhakar Muddu, Christos Tryfonas, and Anurag Maunder; a commonly owned provisionally filed patent application entitled "SYSTEM AND METHODS FOR HANDLING DATA," U.S. Application No. 60/951,912, filed Jul. 25, 2007 by inventors Sudhakar Muddu, Christos Tryfonas, and Anurag Maunder; a commonly owned provisionally filed patent application entitled "SYSTEM AND METHODS FOR SEARCHING DATA," U.S. Application No. 60/951,913, filed Jul. 25, 2007 by inventors Sudhakar Muddu, Christos Tryfonas, and Anurag Maunder; a commonly owned provisionally filed patent application entitled "SYSTEMS AND METHODS FOR PERFORMING INTEGRATED SEARCHES WITH ACTIONS," U.S. Application No. 60/951,915, filed Jul. 25, 2007 by inventors Sudhakar Muddu, Christos Tryfonas, and Anurag Maunder; and a commonly owned provisionally filed patent application entitled "SYSTEMS AND METHODS FOR MANAGING FILE MOVEMENT," U.S. Application No. 60/951,916, filed Jul. 25, 2007 by inventors Sudhakar Muddu, Christos Tryfonas, and Anurag Maunder, all of which are incorporated herein by reference.

BACKGROUND OF THE INVENTION

Search engines have been widely utilized for searching for data on the Internet and/or in file repositories.

Figure 1A:
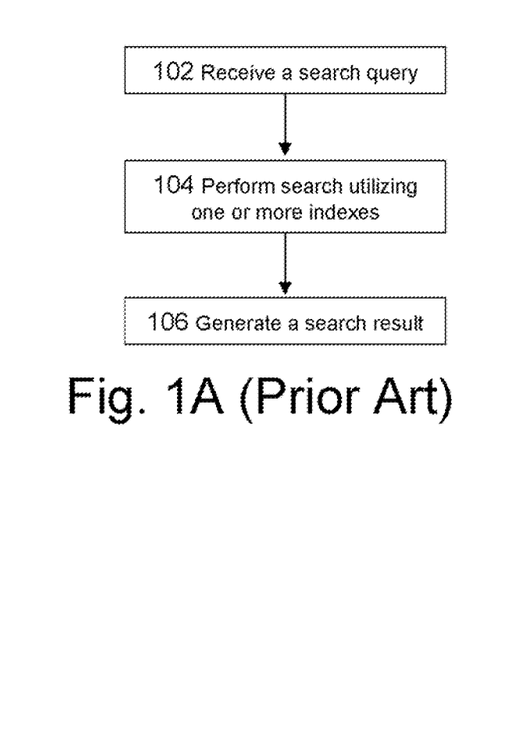
FIG. 1A illustrates a flowchart of an example prior art process performed by a typical search engine for generating a search result.

FIG. 1A illustrates a flowchart of an example prior art process performed by a typical search engine for generating a search result. In step 102, the search engine may receive a search query. In step 104, the search engine may perform a search utilizing one or more indexes. In step 106, the search engine may generate the search result. The search result may include a list of files that are found as well as data related to the files. In some prior art systems, the search result may be further processed to produce a search report, as illustrated in the example of FIG. 1B.

Figure 1B:
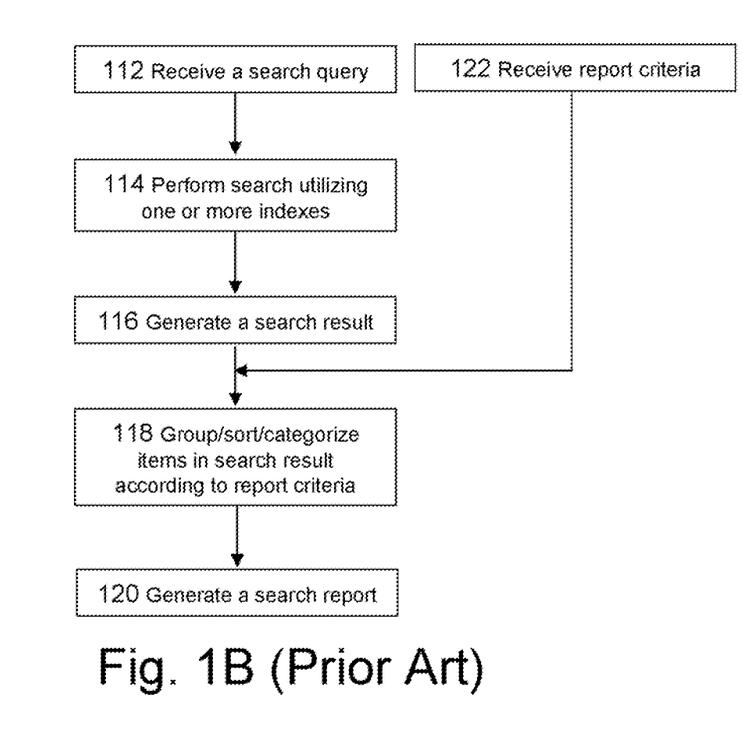
FIG. 1B illustrates a flowchart of an example prior art process for generating a search report.

FIG. 1B illustrates a flowchart of an example prior art process for generating a search report. Steps 112-116 may be similar to similar to steps 102-106 illustrated in the example of FIG. 1A, such that a search engine may generate a search result. In step 122, the search engine or a report program may receive a set of report criteria. In step 118, the search engine or the report engine may group, sort, and/or categorize items in the search result according to the report criteria. In step 120, the search engine or the report program may generate a search report. The search report may include data of files that are grouped, sorted, or categorized according to relevance, date, filename, etc.

With a search result or a search report, a user may need to perform one or more actions, such as one or more of copying, moving, deleting, locking, legal-holding, email conversion, etc., of one or more items in the search result or report. Generally, the actions may be performed manually. Alternatively, various users of various computers (or nodes) may create various ad hoc scripts for performing the actions. A script may be implemented for a specific action to be performed on a specific file on a specific computer platform. The script may not be able to be utilized on another platform, or another file, or another action. A script may not be able to handle more complicated action requirements. Further, since different users may implement different scripts for different nodes on a network, performance of actions across the nodes may be inconsistent and unmanageable.

SUMMARY OF INVENTION

An embodiment of the invention relates to a system for performing integrated searches and actions. The system may include a search engine configured to generate a search result or report in response to a search query. The system may also include a queue manager coupled with the search engine. The queue manager may be configured to receive the search result or report from the search engine. The queue manager may also be configured to assign files in the search result or report to one or more service provider queues according to an action profile. The system may also include one or more nodes coupled with the one or more service provider queues. The one or more nodes may be configured to perform one or more actions on one or more files in the one or more service provider queues according to the action profile. The system may also include a security manager configured to control performance of the actions.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

One or more embodiments of the present invention relate to a system for performing integrated searches and actions. The terms "action" and "service" may be utilized interchangeably in this application. The system may include a user interface configured to receive a search query and an action profile. The action profile may define one or more actions to be performed on one or more items (or files) resulted from a search in response to the search query. The system may include a search engine configured to perform the search and to generate a search result. The search result may also represent a formatted search report.

The system may also include a queue manager coupled with the search engine. The queue manager may be configured to receive the search result (or report) from the search engine. The queue manager may also be configured to assign files in the search result to one or more service provider queues according to the action profile.

The system may also include a cluster of distributed nodes coupled with the one or more service provider queues for performing actions/services on the files. For example, the system may also include a first node coupled with the one or more service provider queues. The first node may include a first service provider configured to perform a first action on a first set of files in the one or more service provider queues according to the action profile. The first node may include a second service provider configured to perform a second action on a second set of files in the one or more service provider queues according to the action profile. Each of the first and second sets of files may be part of the search result or report.

The system may also include a second node coupled with the one or more service provider queues. The second node may include a third service provider configured to perform the first action on a third set of files in the one or more service provider queues according to the action profile. The second node may include a fourth service provider configured to perform the second action on a fourth set of files in the one or more service provider queues according to the action profile. Each of the third and fourth sets of files may be part of the search result or report.

The system may also include a security manager. The security manager may be configured to control the one or more actions (including the first and second actions) according to one or more policies and/or rules. In one or more embodiments, the one or more rules may also pertain to disposal of duplicates in the search result and/or duplicates of items in the search result.

The system may also include a job manager coupled with the queue manager and the search engine. The job manager may also be configured to manage the performance of the actions. The job manager may also be configured to manage restart of actions according to checkpoints maintained in a job manager database.

The features and advantages of the invention may be better understood with reference to the figures and discussions that follow.

Figure 2:
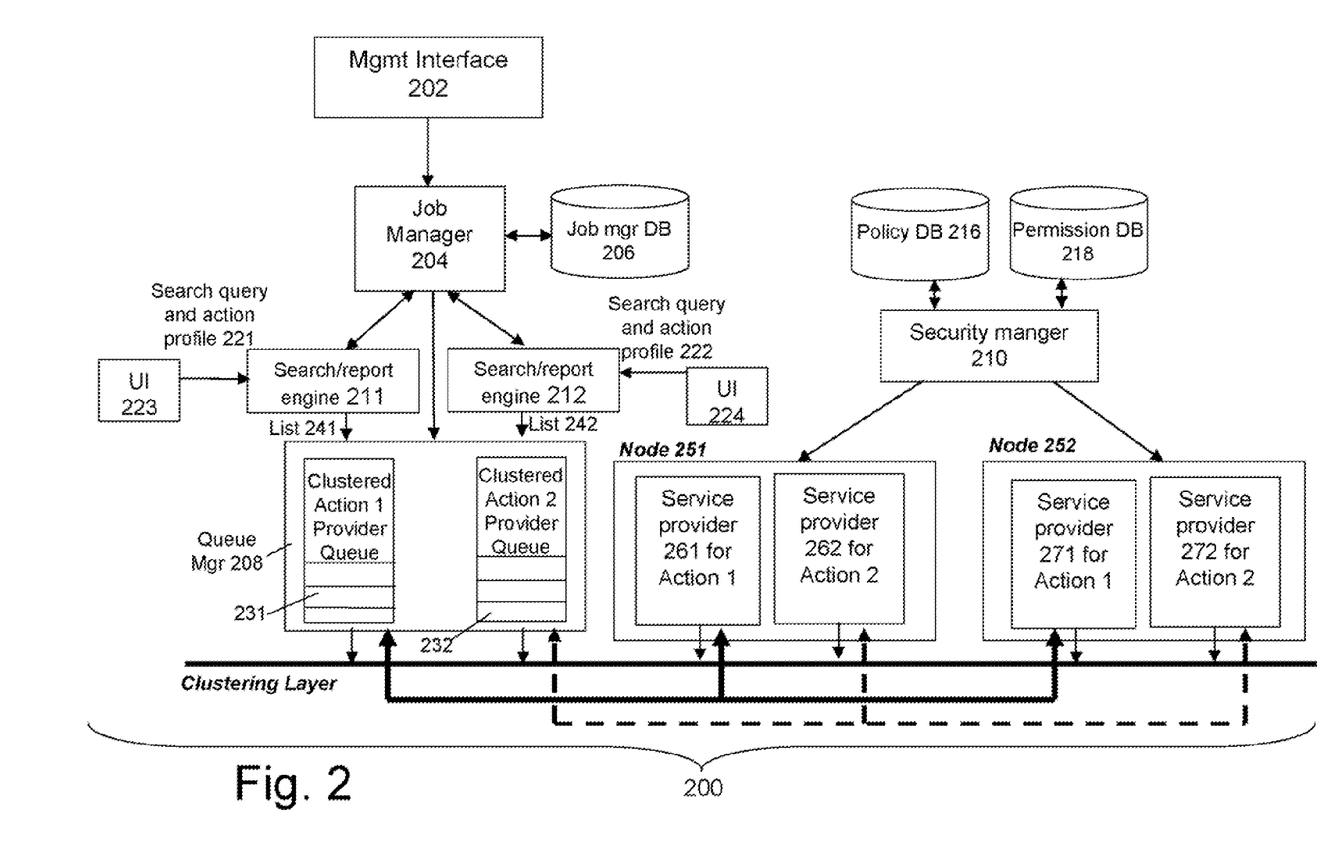
FIG. 2 illustrates a block diagram of a system configured to perform integrated searches and actions in accordance with one or more embodiments of the present invention.

FIG. 2 illustrates a schematic representation of a block diagram of system 200 configured to perform integrated searches and actions in accordance with one or more embodiments of the present invention. System 200 may include one or more search/report engines, such as search/report engines 211 and 212. Search/report engines 211 and 212 may receive search queries and action profiles, such as query-action profiles 221 and 222, through one or more user interfaces, such as user interfaces 223 and 224. Accordingly, search/report engines 211 and 212 may generate one or more search results (or search reports), which may include items in lists 241 and 242.

System 200 may also include a queue manager 208 configured to receive lists 241 and 242. Queue manager 208 may assign each of lists 241 and 242 to one or more service/action provider queues, such as queues 231 and 232. Queue 231 may represent a queue of files that require a certain action, or action 1, e.g., "copy." Queue 232 may include items that require a different action, or action 2, e.g., "delete."

System 200 may also include one or more nodes (e.g., computers), such as nodes 251 and 252, including service providers for performing the actions on files in the service/action provider queues. For example, node 251 may include a service provider 261 for performing action 1 on a first set of files and a service provider 262 for performing action 2 on a second set of files. As another example, node 252 may include a service provider 271 for performing action 1 on a third set of files and a service provider 272 for performing action 2 on a fourth set of files.

System 200 may also include a security manager 210 coupled with a policy database 216 and a permission database 218. Security manager 210 may be configured to control the performance of the actions, such that the actions are performed according to security policies and permission rules specified in policy database 216 and permission database 218.

System 200 may also include a job manager 204 coupled with queue manager 208 and the search/report engines. Job manager 204 may be configured to manage the assignment of items (or identifiers of items/files) on lists 241 and 242. Job manager 204 may also be configured to manage the performance of the actions. Job manager 204 may also be configured to manage restart of actions according to checkpoints maintained in a job manager database 206.

System 200 may also include a management interface 202 coupled with job manager 204. Management interface 202 may be configured for a system administrator of system 200 to operate and configure job manager 204.

Figure 3:
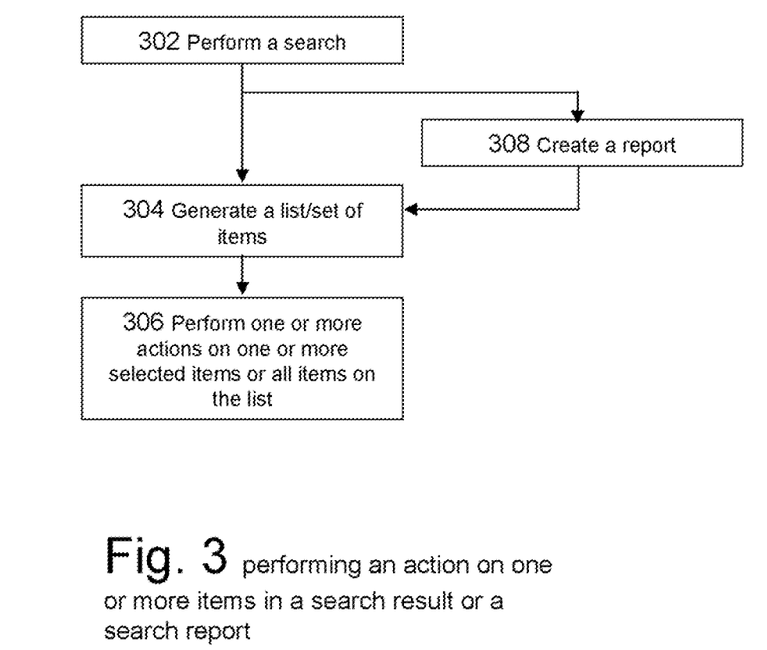
FIG. 3 illustrates a flowchart of a method for performing integrated searches and actions in accordance with one or more embodiments of the present invention.

FIG. 3 illustrates a flowchart of a method for performing integrated searches and actions in accordance with one or more embodiments of the present invention. The method may start in step 302, in which a search/report engine (such as search/report engine 211 illustrated in the example of FIG. 2) may perform a search. In step 308, the search/report engine may create a search report. In step 304, job manager 204 (illustrated in the example of FIG. 2) may trigger search/reports that generate a list (or set) of items utilizing the search result from step 302 or the search report resulted from step 308. In step 306, one or more service providers (such as service providers 261-262 illustrated in the example of FIG. 2) may perform one or more actions on one or more selected items or all items on the list. The selected items may be selected by a user through a user interface that is configured for receiving both search queries and action profiles.

Figure 4:
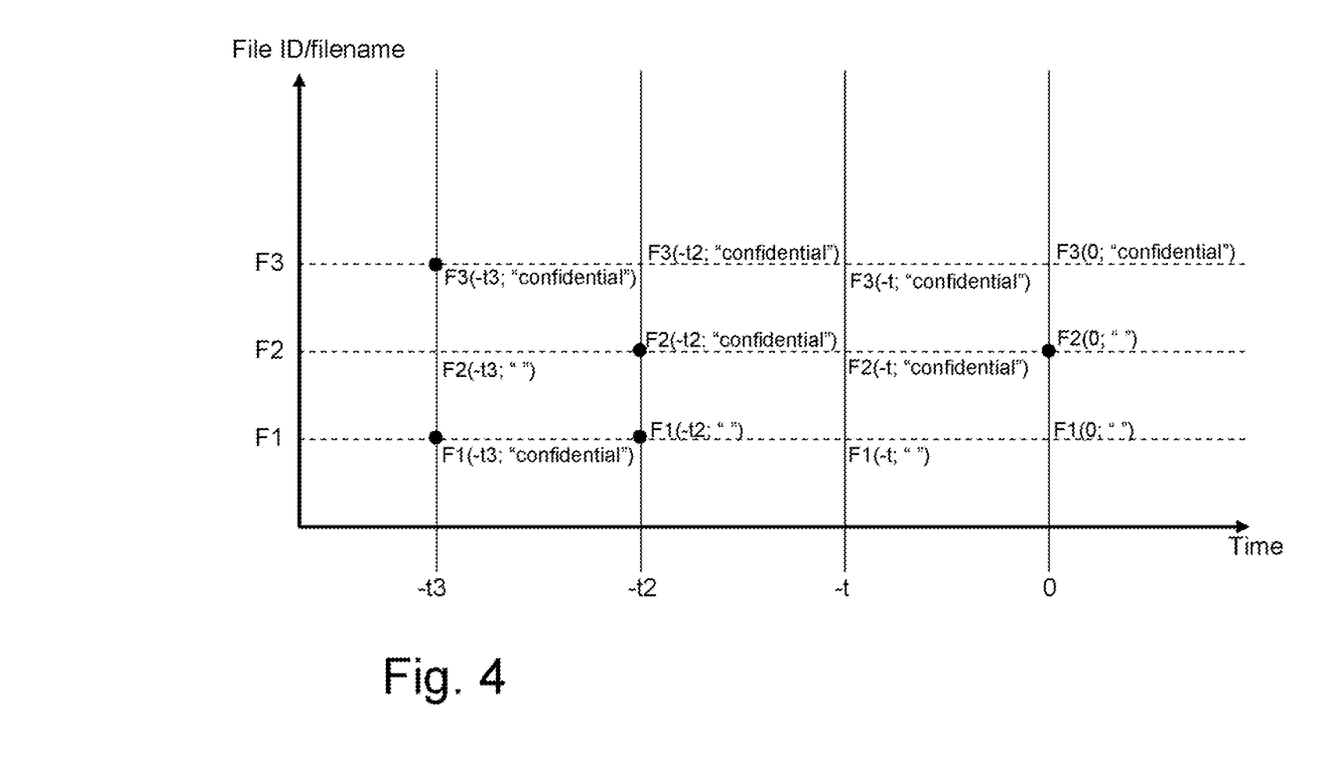
FIG. 4 illustrates a schematic representation of filesystem snapshots with different versions of files at past times and a current time in accordance with one or more embodiments of the present invention.

FIG. 4 illustrates a schematic representation of filesystem snapshots with different versions of files F1, F2, and F3 at past times (−t3, −t2, and −t) and a current time 0 (e.g., the time a search is performed or the time an action is to be taken) in accordance with one or more embodiments of the present invention.

As an example, a search for files with a keyword "confidential" may be performed. The search result may include F1 (−t3; "confidential"), i.e., a version of file F1 at time −t3 containing the keyword "confidential." The search result may also include two versions of file F2 at −t2 and −t. The search result may also include four versions of file F3 at −t3, −t2, −t, and 0. An action may be specified in an action profile to be performed on all files that contain the keyword "confidential."

In one or more embodiments, system 200 (illustrated in the example of FIG. 2) may perform the action on all the versions of files F1, F2, and F3 that contain the keyword "confidential." Accordingly, the action may be performed on 7 files: 1 version of file F1, versions of file F2, and 4 versions of F3.

In one or more embodiments, system 200 may perform the action only on the latest versions of files F1, F2, and F3 that contain the keyword "confidential." Accordingly, the action may be performed on 3 files: F1 (−t3; "confidential"), F2 (−t; "confidential"), and F3 (0; "confidential").

In one or more embodiments, system 200 may perform the action on only the earliest versions of files F1, F2, and F3 that contain the keyword "confidential." Accordingly, the action may be performed on 3 files: F1 (−t3; "confidential"), F2 (−t2; "confidential"), and F3 (−t3: "confidential").

In one or more embodiments, system 200 may perform the action on only the current versions of files F1, F2, and F3 that contain the keyword "confidential." Accordingly, the action may be performed on 1 file: F3 (0; "confidential").

In one or more embodiments, system 200 may perform the action and/or a different action on different versions and/or duplicates of the files. For example, system 200 may tag matched files in a search result and may tag (e.g., utilizing a different tag for identification) duplicates of the matched files.

Figure 5:
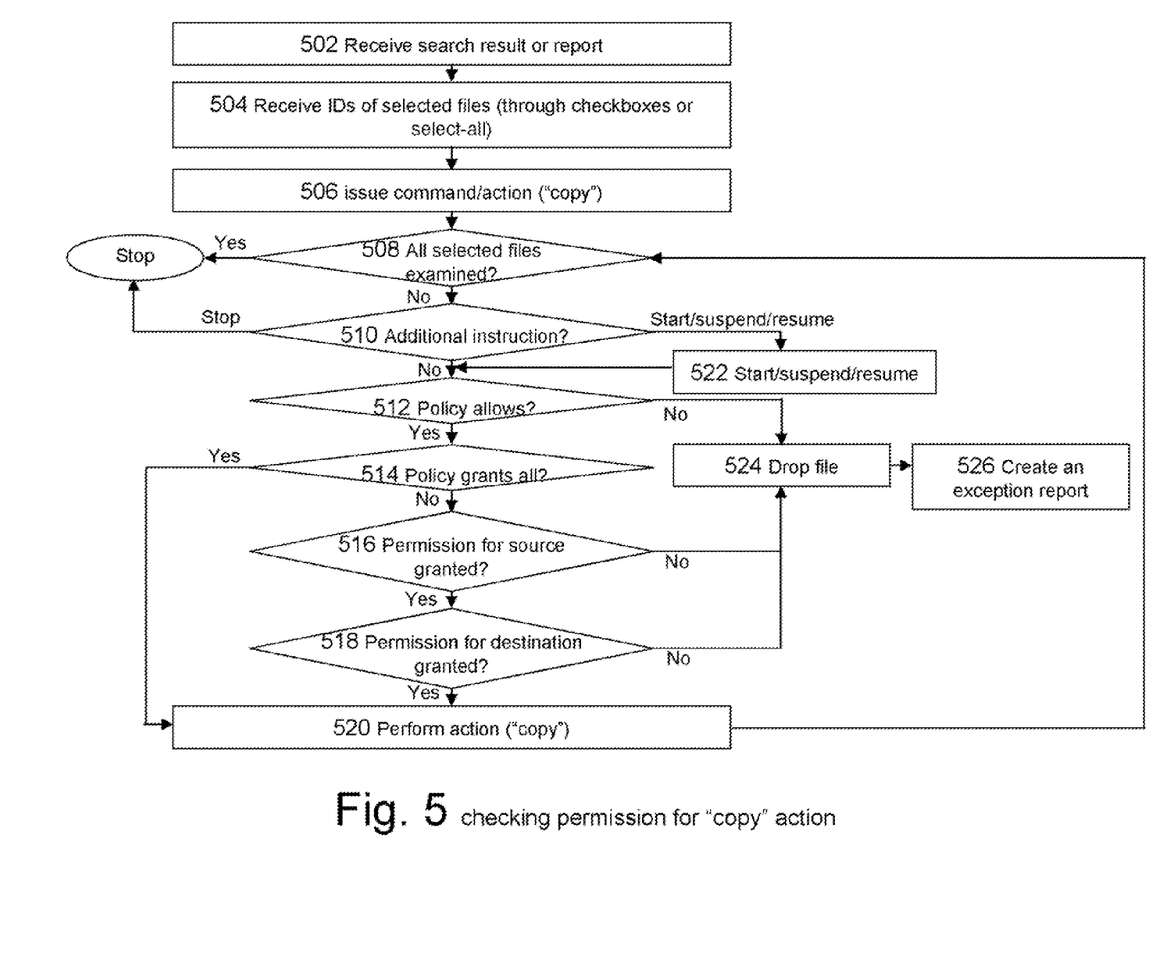
FIG. 5 illustrates flowchart of a method for performing actions in a secure manner in accordance with one or more embodiments of the invention.

FIG. 5 illustrates flowchart of a method for performing actions in a secure manner in accordance with one or more embodiments of the invention. The method may start with step 502, in which system 200 (or job manager 204, illustrated in the example of FIG. 2) may receive a search result (or a search report), for example, from search/report engine 211.

In step 504, system 200 (or job manager 204) may receive identifiers of selected files, for example, through check boxes or a select-all box in a user interface, such as user interface 223 illustrated in the example of FIG. 2.

In step 506, job manager 204 may issue a command for performing the action specified in the action profile, for example, query-action profile 221, received through user interface 223. As an example, the action may represent "copy."

In step 508, system 200 (or job manager 204) may determine whether all selected files have been examined according to one or more policies and/or permission specifications stored in policy database 216 and permission database 218 illustrated in the example of FIG. 2. If all the selected files have been examined, the process may be stopped; if not, control may be transferred to step 510.

In step 510, system 200 (or job manager 204) may determine whether there are any additional instructions in the action profile. If an additional instruction exists to instruct the process to be stopped, the process may be stopped. If an additional instruction specifies that the process is to be started, suspended, and/or resumed, control may be transferred to step 522, in which the process may be started, suspended, and/or resumed. If there is no additional instruction, control may be transferred to step 512.

In step 512, system 200 (or security manager 210, illustrated in the example of FIG. 2) may determine whether the one or more policies and/or permission specifications allow the action, e.g. "copy," to be performed. If the action is allowed to be performed, control may be transferred to step 514. If the action is not allowed to be performed, control may be transferred to step 524, in which the file may be dropped. Following step 524, in step 526, system 200 may create an exception report, which indicates the action is not performed on the particular file.

In step 514, system 200 (security manager 210) may determine whether the one or more policies and/or permission specifications grant the action to be performed on all the selected files. If the action is granted to be performed on all the selected files, control may be transferred to step 520, in which the action may be performed on all the selected files. If the policy does not grant the action to be performed on all the selected items, control may be transferred to step 516.

In step 516, system 200 (or security manager 210) may determine whether the permission for the action. i.e., making a copy, is granted for the source of the file. If no permission is granted, control may be transferred to step 524, in which the file may be dropped. Subsequently, in step 526, an exception report may be created. If permission for making a copy is granted for the source of the file, control may be transferred to step 518.

In step 518, system 200 (or security manager 210) may determine whether permission for making a copy of the selected file is granted for the destination of the file. If no permission is granted, control may be transferred to step 524, in which the file may be dropped. Subsequently, in step 526, an exception report may be generated. If permission is granted, control may be transferred to step 520.

In step 520, system 200 (or one or more of service providers 261-262 and 271-272) may perform the action. Subsequently, control may be transferred back to step 508 until all the selected files are dropped or performed the action on.

Figure 6:
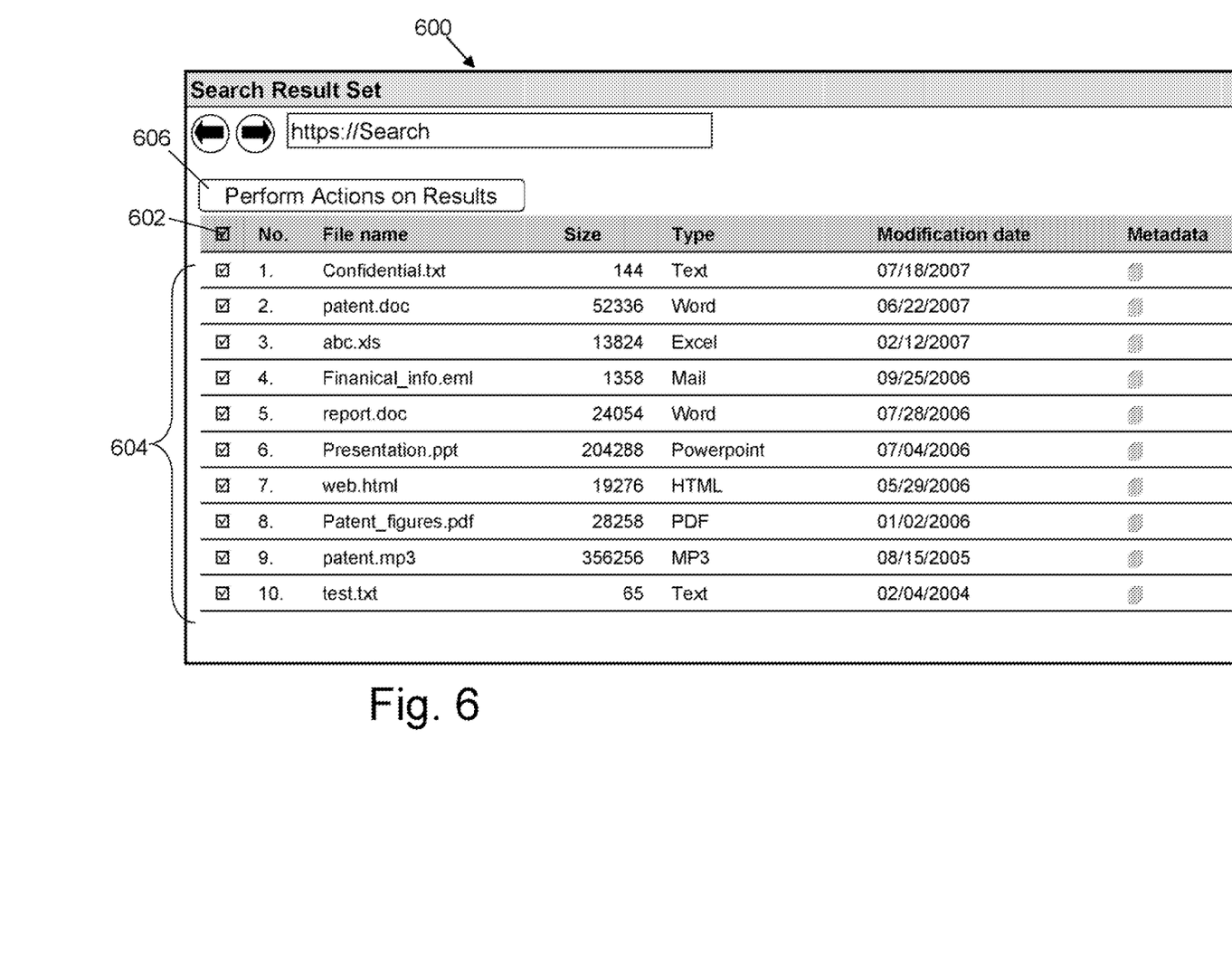
FIG. 6 illustrates a schematic representation of a browser window as part of a user interface for a user to select one or more search result/report items and to request one or more actions to be performed on the selected items in accordance with one or more embodiments of the invention.

FIG. 6 illustrates a schematic representation of a browser window as part of a user interface (such as user interface 223 illustrated in the example of FIG. 2) for enabling a user to select one or more search result/report items (or files) and to request one or more actions to be performed on the selected items in accordance with one or more embodiments of the invention. Browser window 600 may include check boxes 604 for the user to select one or more items. Browser window 600 may also include a select-all box 602 for the user to select all the items on the list with only one click. Browser window 600 may also include a button 606 for the user to perform one or more actions on the selected items.

Figure 7:
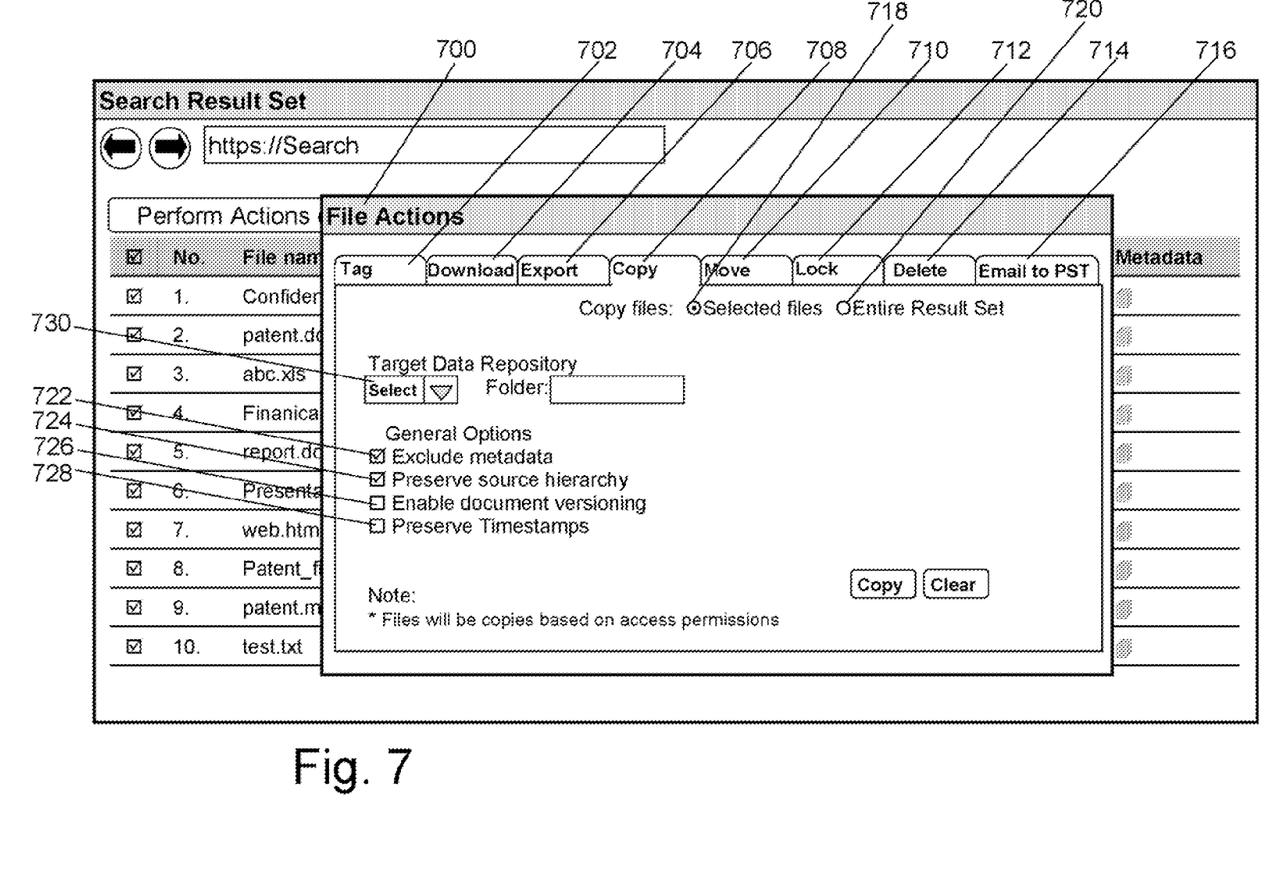
FIG. 7 illustrates a schematic representation of a pop-up window for a user to select one or more actions to be performed on one or more search result/report items in accordance with one or more embodiments of the present invention.

FIG. 7 illustrates a schematic representation of a pop-up window for a user to select one or more actions to be performed on one or more search result/report items in accordance with one or more embodiments of the present invention. Pop-up window 700 may appear after button 606 (illustrated in the example of FIG. 6) has been clicked. As illustrated in the example of FIG. 7, pop-up window 700 may include tabs 702-716 configured to enable the user to select one or more of tagging, downloading, exporting, copying, moving, locking, deleting, performing legal-hold, and email-to-PST-conversion actions. Tab 702 may enable the user to enter tags for selected files. Tab 704 may enable the user to download selected files to a specific device, data store, or a compressed file (e.g., ZIP files).

Tab 706 may enable the user to export the selected file list in specified formats. Tab 708 may enable the user to copy one or more selected files from a source data store or directory to one or more destination data stores or directories. Tab 710 may enable the user to move files from one or more source data stores or directories to one or more destination data stores or directories. Tab 712 may enable the user to lock one or more files for a specified period of time or until a specified time. Tab 714 may enable the user to delete one or more files. Tab 716 may enable the user to convert internet e-mail messages into the Microsoft PST format.

In the example of FIG. 7, tab 708 may be clicked for performing copy actions. Sophisticated options may be provided for the copy actions. For example, the user may be able to determine whether to copy only selected files or to copy the entire result set utilizing radio buttons 718 and 720. The user may also be able to combine the copy action with other actions, for example, utilizing a pull-down menu 730. Pop-up window 700 may also provide several general options for the copy actions, such as for the users to exclude metadata, to preserve source hierarchy, to enable document versioning, and/or to preserve timestamps of the original files through one or more of check boxes 722-728. Tab 704 may also enable the user to download files to ZIP files.

Figure 8:
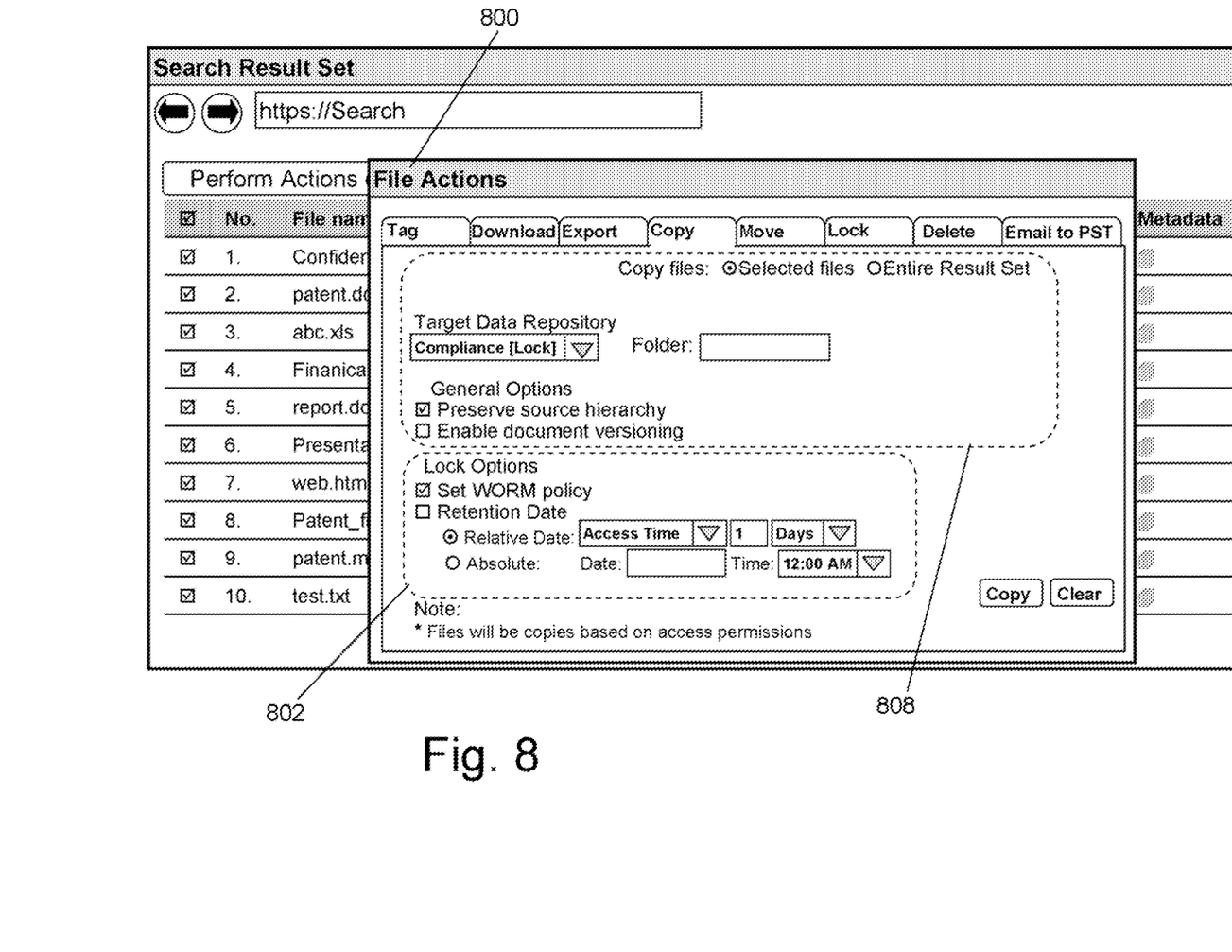
FIG. 8 illustrates a schematic representation of a pop-up window for configuring a compound action in accordance with one or more embodiments of the present invention.

FIG. 8 illustrates a schematic representation of a pop-up window 800 for configuring a compound action in accordance with one or more embodiments of the present invention. In the example of FIG. 8, an action profile containing a compound action, including a "copy" action and a "lock" action, is illustrated. Pop-up window 800 may appear when an action "lock" is selected utilizing a pull-down menu 730 illustrated in the example of FIG. 7. Pop-up window 800 may provide options 808 for configuring "copy" actions and options 802 for configuring "lock" actions.

As can be appreciated from the foregoing, embodiments of the present invention may provide integrated search, report, and actions for data management. Accordingly, search, report, and metadata may be integrated with business processes without requiring implementing ad hoc and inconsistent scripts or requiring substantial manual manipulation. Advantageously, embodiments of the invention may enable and/or facilitate search results and reports to be actively directed to useful work that support business processes. Embodiments of the invention may also enable automation of sequential and/or compound actions. As a result, efficiency of business processes may be substantially improved.

Embodiments of the invention provide integrated user interfaces for both search and actions. Accordingly, user experience may be substantially improved. Advantageously, users may be more efficient in performing various tasks.

Implementing a cluster configuration with distributed nodes, embodiments of the invention may provide scalable searches, reporting, and actions. Further, searches and actions may be performed with fault tolerance and with balanced work load across the nodes.

Embodiments of the invention may also provide high-granularity control of access to files, thereby ensuring security and integrity of data.

Embodiments of the invention may also enable restart of actions at checkpoints. Accordingly, actions to be efficiently and effectively performed on a large number of search results may be enabled even if system capacity is limited or insufficient.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A system for performing at least one action on a search result, the system comprising:
    one or more service provider queues resident on one or more node computers in a cluster of node computers;
    a queue manager coupled with the service provider queues, the queue manager configured to receive the search result and an action profile defining at least one action to be performed on files of the search result, and to assign the files of the search result to the service provider queues according to the action profile; and
    the cluster of node computers coupled with the service provider queues, each of the node computers performs at least one action in accordance with one or more rules defined in the action profile, the cluster of node computers includes a first node computer and a second node computer, each of the first and second node computers includes a first service provider that perform a first action of the at least one action on a first set of the assigned files of the search result and a second service provider that perform a second action of the at least one action on a second set of the assigned files of the search result.

2. The system of claim 1 wherein the search result comprises one or more items, the system further comprising a user interface configured to receive first user input pertaining to selection of the one or more items from the search result and second user input pertaining to the action profile.

3. The system of claim 2 wherein the user interface is further configured to receive the search query from the user pertaining to the search result.

4. The system of claim 1 further comprising a security manager configured to control the at least one action according to at least one of one or more policies and one or more rules.

5. The system of claim 4 wherein the one or more rules pertain to versions and confidentiality of the one or more items.

6. The system of claim 1 wherein the at least one action includes disposal of duplicates in the one or more items.

7. The system of claim 1 wherein the at least one action includes at least one of identifying duplicates in the one or more items and tagging the duplicates.

8. The system of claim 1 wherein the queue manager is further configured to assign duplicates of the one or more items to the one or more service provider queues, the at least a portion of the at least one action performed on the duplicates of the one or more items.

9. The system of claim 1 further comprising a job manager configured to provide the set of identifiers of the one or more items to the queue manager.

10. The system of claim 1 further comprising a job manager configured to manage performance of the at least one action, the job manager further configured to manage restart of the at least one action according to a set of checkpoints.

11. The system of claim 1 wherein the at least one action includes at least one or more of tagging, downloading, exporting, copying, moving, locking, deleting, legal-holding, and email conversion.

12. The system of claim 1 wherein the action profile contains at least a compound action, the compound action includes at least two of tagging, downloading, exporting, copying, moving, locking, deleting, legal-holding, and email conversion.

13. A method for performing at least one action on one or more items in a search result, the method comprising:
receiving a set of one or more items comprising the search result;
receiving an action profile, the action profile defining at least one action to be performed on one or more of the items in the search result;
assigning a first set of the one or more items to a first service provider queue resident on a first node of a cluster of node computers and a second set of the one or more items to a second provider queue resident on the first node, each service provider queue representing a specific action;
assigning a third set of the one or more items to a third service provider queue resident on a second node of the cluster of node computers and a fourth set of the one or more items to a fourth provider queue resident on the second node, each service provider queue representing a specific action;
retrieving the first, second, third and fourth sets of items from the first, second, third and fourth service provider queues; and
performing, a first action on the first and third sets of items using the first service provider and a second action on the second and fourth sets of items using the second service provider, in accordance with one or more rules defined in the action profile.

14. The method of claim 13 further comprising receiving first user input pertaining to selection of the one or more items from the search result and second user input pertaining to the action profile from a same user interface.

15. The method of claim 13 further comprising controlling the at least one action according to at least one of one or more policies and one or more rules.

16. The method of claim 15 further comprising creating an exception report if the at least one action is disallowed according to the at least one of the one or more policies and the one or more rules.

17. The method of claim 15 wherein the one or more rules pertain to versions of the one or more items in filesystem snapshots.

18. The method of claim 15 wherein the one or more rules pertain to disposal of duplicates in the one or more items.

19. The method of claim 18 wherein the one or more rules requiring tagging the duplicates.

20. The method of claim 13 wherein the one or more rules pertain to duplicate versions of the one or more items in a filesystem or an email store.

21. The method of claim 13 further comprising managing restart of the at least one action according to a set of checkpoints.

22. The method of claim 13 wherein the action profile contains at least a compound action, the compound action includes at least two of tagging, downloading, exporting, copying, moving, locking, deleting, legal-holding, and email conversion.

* * * * *